United States Patent [19]

Barriere et al.

[11] 3,988,224

[45] Oct. 26, 1976

[54] METHOD OF EXTRACTION OF METALLIC ELEMENTS FROM SUBMARINE NODULES

[75] Inventors: Jacques Barriere, Fontenay-aux-Roses; Michèle Robaglia, Orsay, both of France

[73] Assignee: Commissariat a l'Energie Atomique, Paris, France

[22] Filed: Dec. 16, 1975

[21] Appl. No.: 641,238

[30] Foreign Application Priority Data

Dec. 18, 1974   France .................... 74.41838

[52] U.S. Cl. .................... 204/108; 204/113; 204/128; 423/24; 423/50; 423/54; 423/63; 423/100; 423/105; 423/112; 423/129; 423/139; 423/592

[51] Int. Cl.² .................... C25C 1/12

[58] Field of Search ........... 204/108, 113, 128, 112; 423/24, 32, 38, 35, 54, 55, 63, 65, 68, 100, 105, 109, 112, 129, 131, 132, 139, 140, 150, 158, 487; 75/103

[56] References Cited
UNITED STATES PATENTS

| | | | |
|---|---|---|---|
| 2,937,072 | 5/1960 | McLean | 423/63 |
| 3,085,054 | 4/1963 | Thornhill | 204/113 |
| 3,151,946 | 10/1964 | Naguno et al. | 423/139 |
| 3,446,720 | 5/1969 | Brooks | 204/112 |
| 3,734,715 | 5/1973 | Redman | 75/103 |
| 3,751,554 | 8/1973 | Bare et al. | 423/150 |
| 3,880,651 | 4/1975 | Queneau et al. | 423/50 |
| 3,887,679 | 6/1975 | Wigstol et al. | 423/24 |
| 3,950,486 | 4/1976 | Cardwell et al. | 423/38 |
| 3,950,488 | 4/1976 | Skarbo et al. | 423/24 |

*Primary Examiner*—Oscar R. Vertiz
*Assistant Examiner*—Brian E. Hearn
*Attorney, Agent, or Firm*—William R. Woodward

[57] ABSTRACT

A hydrochloric acid leach solution is subjected to a first cycle of extraction by an organic solvent, solvent washing and stripping so that the stripping liquor contains iron, zinc, cadmium and gallium while the liquor constituted by the first raffinate at the outlet of the extraction unit mainly contains nickel, cobalt and copper. In a second extraction cycle, the stripping liquor contains copper while the second raffinate mainly contains cobalt and nickel. In a third extraction cycle, the stripping liquor contains cobalt while the third raffinate mainly contains nickel.

17 Claims, 2 Drawing Figures

FIG. 1

FIG. 2

METHOD OF EXTRACTION OF METALLIC ELEMENTS FROM SUBMARINE NODULES

This invention relates to a method of extraction of metallic elements and especially nickel, copper and cobalt from manganiferous ores and in particular from submarine nodules.

The nodules formed in deep-sea beds are known as manganese nodules since their main constituent is $MnO_2$. The appearance of these nodules and the mean concentration of metals in these latter according to the ocean zones in which they occur have been described in detail by J. L. Mero, in particular in U.S. Pat. No. 3,169,856 which gives a list of the principal metals contained in the nodules and their concentrations. The weight composition of the nodules with respect to their dry weight is usually as follows:

| Mn | 8 | to | 40 | % |
|---|---|---|---|---|
| Fe | 3 | to | 25 | % |
| Ni | 0.7 | to | 2 | % |
| Cu | 0.5 | to | 1.6 | % |
| Co | 0.1 | to | 0.5 | % |
| Zn | 0.05 | to | 0.12 | % |
| Mo | 0.03 | to | 0.1 | % |
| Ga | 0.001 | to | 0.023 | % |
| $SiO_2$ | 12 | to | 20 | % |
| K, Na, Mg | 2 | to | 9 | % |

The recovery of nodules by dredging, injection of air or hydraulic pumping is being studied and has formed the subject of a large number of patents among which can be cited U.S. Pat. Nos.: 3,226,854, 3,456,371, 3,480,326, 3,504,943, the Canadian Pat. Nos.: 928,337 and 928,338 and French Pat. No. 2,067,797.

Among the recoverable metals, nickel and copper offer the most attractive prospects since world reserves of ores which are rich in nickel or in copper are decreasing rapidly and it is becoming advantageous to process low-grade ores. Cobalt, gallium, molybdenum, zinc are contained in the nodules at concentrations such that the recovery of these metals can have the effect of increasing the commercial value of the ore if the recovery operation is not a costly one.

Processing of nodules is carried out by three different methods. In accordance with a first method described in French Pat. No. 2,090,301, leaching is carried out with hydrochloric acid and with steam. In accordance with a second method described in French Pat. No. 2,090,300, U.S. Pat. No. 3,169,856, German Pat. No. DAS 2,150,785 and French patent application No EN 74 06888, leaching is carried out with sulphurous anhydride in an aqueous medium. The third method which is based on a reduction followed by ammonia leaching is drawn directly from U.S. Pat. No. 1,487,145 granted to M. H. Caron and from the corresponding publication entitled "Ammonia leaching of nickel and cobalt ores" by M. H. Caron (trans. AIME 188/1950, Journal of Metals 67) which gives an example of recovery of nickel and cobalt essentially from lateritic ores but also from an ore having a high manganese content.

However, the ores studied by M. H. Caron do not contain copper and do not have the specific mineralogical structure of the nodules. French Pat. Nos.: 2,098,453, 2,098,455 and U.S. Pat. Nos.: 3,736,125 and 3,751,554 have described in broad outline the application of the Caron process to nodules for extracting nickel, copper, cobalt and molybdenum. French Pat. No. 2,113,978 is an alternative to the method of M. H. Caron since reduction and leaching are performed in a single stage within an autoclave in this process. Finally, in U.S. Pat. No. 3,471,285, there is described a method of reduction and ammonia leaching for the recovery of only manganese and iron.

The invention is directed to a method of extraction of metallic elements from manganiferous ores and more particularly from submarine nodules in which the ore is roasted in a controlled reducing atmosphere, cooled in an inert atmosphere, leached in a number of counter-current stages by means of a mixture of ammonia and aerated ammonium carbonate in a concentration ratio such as to obtain a buffered pH value of the solution which is distilled by steam entrainment, thereby causing precipitation of the carbonates. Said method is distinguished by the fact that the concentrate obtained is attacked by hydrochloric acid, the resultant hydrochloric acid leach solution is subjected to a first cycle of extraction by an organic solvent selected from tributylphosphate and a secondary amine diluted in an organic diluent comprising extraction, washing and stripping so that the stripping liquor contains iron, zinc, cadmium and gallium whilst the liquor constituted by the first raffinate at the outlet of the extraction unit mainly contains nickel, cobalt and copper, the hydrochloric acid liquor of the first raffinate is subjected to a second cycle of extraction by an organic solvent constituted by a tertiary amine hydrochlorate diluted in an organic diluent comprising extraction, washing and then stripping so that the stripping liquor contains copper whilst the liquor which constitutes the second raffinate at the outlet of the extraction unit mainly contains cobalt and nickel, the hydrochloric acid liquor of the second raffinate is reprocessed, concentrated and subjected to a third cycle of extraction by an organic solvent constituted by a tertiary amine hydrochlorate diluted in an organic diluent comprising extraction, washing and stripping so that the stripping liquor contains the cobalt whilst the liquor which constitutes the third raffinate at the outlet of the extraction unit mainly contains nickel.

In the first extraction cycle, part of the aqueous stripping solution is used for washing the loaded solvent, the wash solution being then re-injected with the feed and the zinc, gallium, cadmium and iron contained in the stripping solution of the first cycle are precipitated in the state of carbonate.

In the second extraction cycle, the wash solution is constituted by part of the aqueous stripping solution which is concentrated in copper chloride.

After stripping of the copper, a small part of the solvent is diverted to a processing circuit in which it is contacted with an aqueous solution which is capable of stripping the molybdenum, the vanadium, the sulphates and the chlorides, the treated solvent being salified before being returned to the extraction.

The stripping liquor which has a high copper content and has previously been mixed with a heat-transporting fluid and with a sulphuric acid liquor is distilled after washing, the distillate is solubilized, separated from the heat-transporting fluid which is recycled to the distillation whilst the copper sulphate which has formed is electrolyzed.

The sulphuric acid liquor mixed with the heat-transporting fluid is obtained from the electrolysis of the copper.

There is performed during the electrolysis a purge which is treated so as to precipitate the copper and the cobalt to the state of carbonate, these latter being recycled to the initial acid leach.

The raffinate of the second extraction is concentrated, then sent to the third extraction cycle in which the wash solution is constituted by part of the aqueous stripping solution which is concentrated in copper chloride.

At the stage of the third extraction cycle, the stripping liquor of the cobalt is washed, concentrated and pyrohydrolyzed in order to obtain cobalt oxide.

The raffinate from the extraction of the cobalt which contains the nickel chloride and certain impurities is subjected to extraction by the nickel salt of di-2-ethylhexylphosphoric acid diluted in an organic diluent in the presence of a heavy alcohol in order to separate the nickel and magnesium chlorides which are sent into a buffer store from which is carried out the electrolysis which produces the nickel and the chlorine.

The concentration of the magnesium chloride in the buffer is maintained constant by means of a purge from which the nickel is separated from the magnesium in order to salify the di-2-ethylhexylphosphoric acid which is employed for the extraction.

The chlorine which is liberated during electrolysis is recombined with hydrogen in order to produce gaseous hydrochloric acid.

The gaseous hydrochloric acid which is liberated at the time of distillation of the copper chloride leach liquor, at the time of pyrohydrolysis of cobalt chloride, at the time of recombination of the hydrogen and the chlorine of the nickel electrolysis is recycled to the initial hydrochloric acid leach.

The leach solution which is separated from the solid receives an addition of ammonium phosphate in an aerated medium in order to precipitate the magnesium, the calcium, the barium, the manganese, the iron and the traces of non-alkaline metallic cations.

Gallium, molybdenum, vanadium and the anionic impurities are removed by treating the leach solution with an anionic resin.

After leaching in a normal atmosphere, the solid phase is separated from the liquid phase which is aerated in order to recover the manganese carbonate whilst the solid phase is subjected to countercurrent leaching with the mixture of ammonia and aerated ammonium carbonate.

Figure 1:
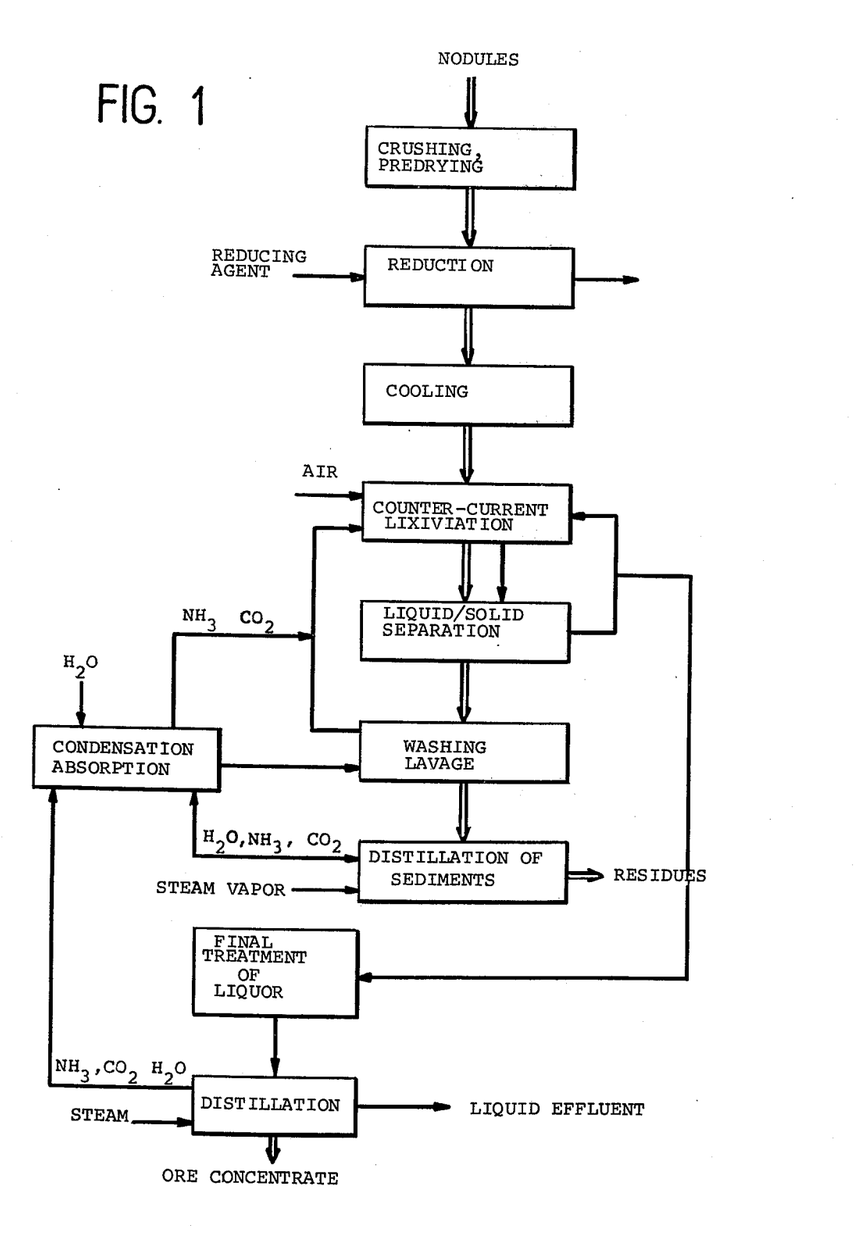
Figure 2:
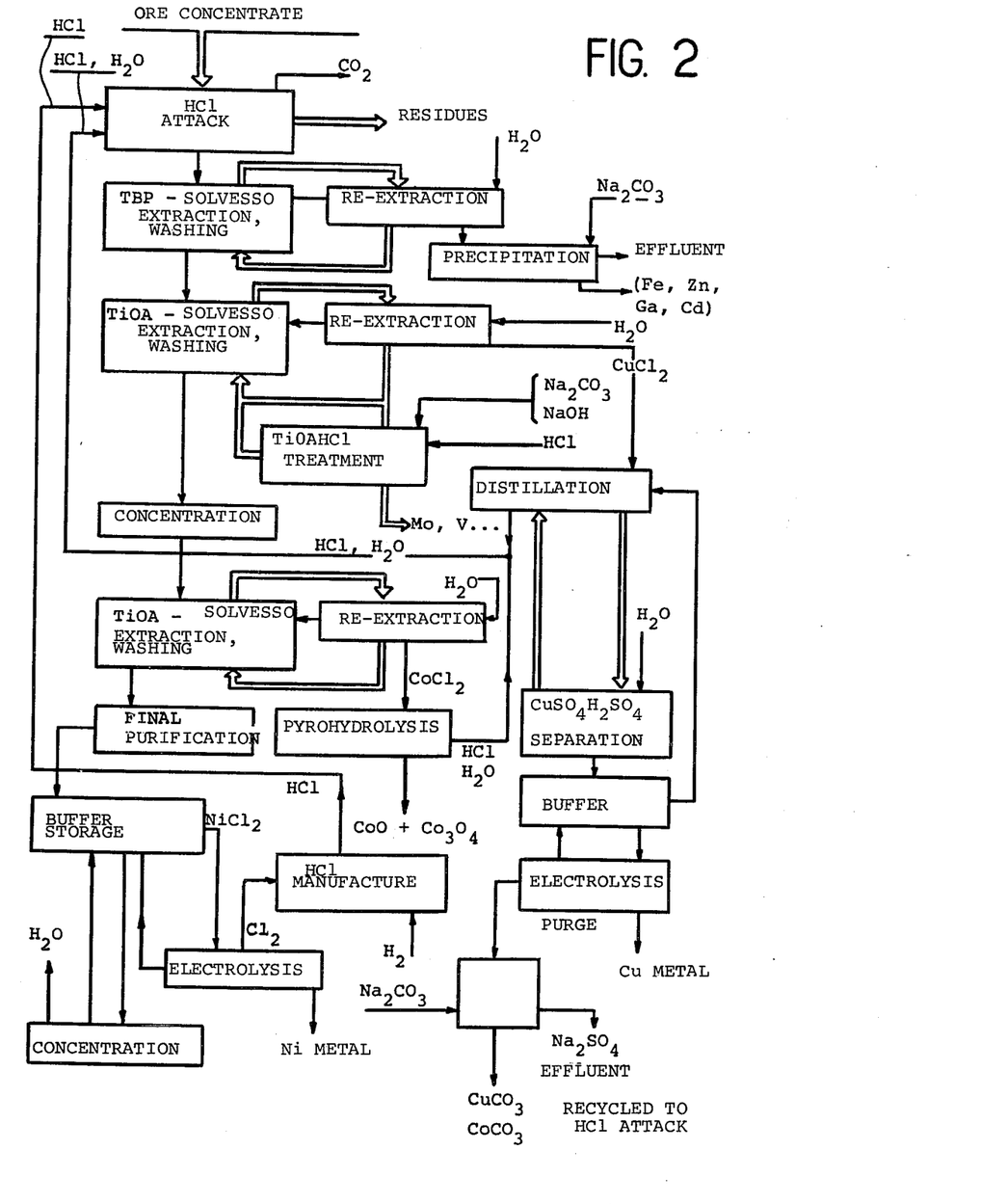

The following description which is given with reference to FIGS. 1 and 2 of the accompanying drawings will serve to show further characteristic features and advantages of the method according to the invention.

Nodules of deep-sea beds are crushed and then reduced at temperatures ranging from 300° to 800° C. The nodules must be dried before subjecting them to the reduction operation; pre-drying does not have any influence on subsequent recovery of metallic values. However, the nodules have an extremely high moisture content and measurements taken have shown weight losses of 12 to 15 % after drying in a normally humid atmosphere at room temperature, of 30 % after drying in a closed oven at 110° C, and of 50 % after drying in vacuo at 130° C. These different values of moisture content correspond roughly to the surface impregnation water, then to the water contained in the open pores and finally to the water trapped in the closed ores of the nodules. At the time of the reduction operation which takes place in the vicinity of 500° to 600° C, a large proportion of the water must be evaporated; it is therefore an advantage to aerate the conveyors before and after crushing and to employ the low degrees of heat produced at different points of the installation in order to effect partial drying of the ore whilst the high exothermicity of the reduction reaction from $MnO_2$ to $MnO$ makes it possible to complete the drying at the commencement of reduction.

It has been the usual practice at the time of tests to employ crushed nodules having particle sizes ranging from 80 $\mu$ to 160 $\mu$ but no variation in reactivity has been observed when employing particle sizes within the range of about 400 $\mu$ to 630 $\mu$ and the drop in reactivity was of a low order in the case of particle sizes of 2 mm. Under these conditions, the preferred particle size is within the range of 630 $\mu$ to 800 $\mu$.

The crushed ore is subjected to a reduction which makes it possible to convert the oxides of nickel, copper and cobalt to metals. During the reduction operation, the manganese dioxide is converted to divalent manganese oxide and the trivalent iron oxide $Fe_2O_3$ is converted to magnetic oxide $Fe_3O_4$. It is advantageous to adjust the reduction so as to ensure that the iron is not reduced further.

This adjustment makes it possible to avoid unnecessary consumption of reducing agent.

Thus, when employing the mixtures $CO-CO_2$ (or $H_2-H_2O$) as reducing agent, it is desirable to maintain a partial pressure of $CO$ (or of $H_2$) which is of higher value as the reduction temperature is higher, that is, of the order of three volumes of $CO$ (or $H_2$) in respect of two volumes of $CO_2$ (or $H_2O$) within the range of about 300° to 600° C and two volumes of $CO$ (or $H_2$) in respect of one volume of $CO_2$ (or $H_2O$) within the range of about 600° to 800° C.

After the reduction operation, the nodules must be cooled in an inert atmosphere (which can be formed by the spent reduction gases) in order to prevent re-oxidation of the ore and then mixed with the leach liquor.

The leach solution must contain both ammonia and ammonium carbonate in order to have a buffered pH which prevents hydrolysis of the cations of the metals to be extracted and their precipitation; the presence of small quantities of air or oxygen is also necessary for re-oxidation of the metals as cations which are capable of forming the soluble aminated complexes.

The concentration in $NH_3$ must be sufficient to permit the formation of complexes and can be within the range of 3 to 9 moles per liter.

The manganese dioxide which has been reduced to $MnO$ at the time of roasting is converted to a mixture of $MnCO_3$ and $MnO_2$ during the oxidation-leaching process. There is therefore a loss of $CO_2$ within the solution. This loss is more appreciable as the ratio of the quantity of solid to the quantity of liquid is higher. It is an advantage to maintain a value of the molar ratio $CO_2/NH_3$ of the solution of the order of 0.3 although values within the range of 0.15 to 0.35 can be considered at suitable.

In order to obtain a leach solution loaded with valuable metals, it is preferable to perform the leaching process countercurrentwise in several stages with recycling of the liquid phase at each stage. This procedure makes it possible to operate with a solid/liquid ratio of the order of 25 % and if necessary to re-adjust the $CO_2$ content between the stages while producing approximately 1.5 m³ of liquor per metric ton of solid. It is then useful to have a solution having a fairly high ammonia content of the order of 5 to 7 moles per liter and a ratio $CO_2/NH_3$ of approximately 0.3. Under these conditions, 4 to 6 two-hour leaching stages are sufficient.

The invention is illustrated by the following nonlimitative examples:

EXAMPLE 1

Influence of particle size

Nodules of deep-sea beds forming part of a first batch having the following mean composition: 21.2 % Mo, 6.2 % Fe, 1.11 % Ni, 0.85 % Cu, 0.20 % Co, were crushed and ground to various particle sizes, reduced by 10 % hydrogen in nitrogen at 500° C, cooled in an inert gas and leached at 40° C with an aerated aqueous solution containing approximately 9 M/l of $NH_3$ and 1.5 M/l of $CO_2$. After twelve hours of leaching with a solid to liquid ratio of 1 to 10, the results obtained were as follows:

| Particle size | % of solubilized metals | | |
|---|---|---|---|
| | Ni | Cu | Co |
| 80 to 160 $\mu$ | 90 | 95 | 65 |
| 200 to 315 $\mu$ | 84 | 89 | 64 |
| 315 to 400 $\mu$ | 87 | 92 | 60 |
| 400 to 630 $\mu$ | 90 | 92 | 60 |
| 1 to 2 mm | 80 | 83 | 50 |

Grinding to a particle size of 600 $\mu$ is therefore sufficient.

EXAMPLE 2

Influence of the reduction temperature

Nodules forming part of a second batch having the following mean composition: 21.5 % Mn, 6.8 % Fe, 0.97 % Ni, 0.70 % Cu, 0.20 % Co were ground to a particle size in the vicinity of 160 $\mu$, then reduced by hydrogen at different temperatures. The reduced nodules were then leached under the same conditions as before.

| reduction temperature | % of solubilized metals | | |
|---|---|---|---|
| | Ni | Cu | Co |
| 200° C | 15 | 23 | 9 |
| 300° C | 69 | 83 | 42 |
| 350° C | 100 | 96 | 45 |
| 400° C | 95 | 95 | 50 |
| 500° C | 100 | 90 | 63 |
| 550° C | 100 | 88 | 70 |
| 600° C | 76 | 67 | 70 |

Excessively high reduction temperatures are therefore detrimental to the recovery of copper.

EXAMPLE 3

Influence of the leaching temperature

Nodules of the second batch were ground to 160 $\mu$, reduced at 50° C and cooled in an inert atmosphere. They were then leached at variable temperatures with an aerated solution containing 5 M/l of $NH_3$ and 1.5 M/l of $CO_2$. After six hours of leaching with a solid/liquid ratio of 1/10, the results obtained were as follows:

| leaching temperature | % of solubilized metals | | |
|---|---|---|---|
| | Ni | Cu | Co |
| 40° C | 77 | 83 | 70 |
| 50° C | 87 | 81 | 70 |
| 60° C | 83 | 85 | 70 |

The increase in the leaching temperature improves the kinetics of dissolution but also results in substantial desorption of ammonia and of carbon dioxide gas. A temperature of approximately 40° to 50° C is sufficient. Since the dissolution reactions are exothermic, it may prove necessary to cool the leach solution.

EXAMPLE 4

Influence of the composition of the leach solution

Nodules were ground, reduced and cooled under the same conditions as in Example 3. They were then leached at 40° C for a period of twelve hours and in a solid/liquid ratio of 1/10.

| Composition of the solution | | Percentage of solubilized metals | | | | Batch of nodules employed |
|---|---|---|---|---|---|---|
| $NH_3$ | $CO_2/NH_3$ | Ni | Cu | Co | Mn | |
| 4 M/l | 0.25 | 80 | 75 | 42 | 0.11 | 1 |
| 4 M/l | 0.30 | 83 | 89 | 40 | 0.07 | 1 |
| 4 M/l | 0.35 | 89 | 89 | 66 | 0.06 | 1 |

An increase in the $CO_2$ content therefore promotes recovery of the cobalt, the copper and the nickel and improves the selectivity of the process.

| $NH_3$ | $CO_2/NH_3$ | Ni | Cu | Co | |
|---|---|---|---|---|---|
| 3 M/l | 0.3 | 81 | 89 | 40 | Batch 2 |
| 5 M/l | 0.35 | 83 | 90 | 59 | Batch 2 |
| 9 M/l | 0.16 | 99 | 90 | 63 | Batch 2 |
| 9 M/l | 0.16 | 93 | 99 | 70 | Batch 1 |

When the $NH_3$ content becomes lower, the recovery of metallic values remains good when about 60 % of the ammonia is in the form of carbonate in the solution.

When the $NH_3$ content becomes higher, the ratio $CO_2/NH_3$ is less critical.

EXAMPLE 5

Influence of the leaching time

Nodules forming part of the first batch were reduced as before. Leaching was performed at 40° C with an aerated solution containing 5 M/l of $NH_3$ and 1.5 M/l of $CO_2$ ($CO_2/NH_3 = 0.30$). At the end of one hour, 90 % of the nickel, 75 % of the copper and 52 % of the cobalt were solubilized.

In a further test, the yields at the end of two hours were 86 % in the case of nickel, 75 % in the case of copper and 76 % in the case of cobalt.

EXAMPLE 6

Influence of the solid/liquid ratio

Nodules forming part of the second batch were processed as before, then leached at 40° C for a period of twelve hours with different solutions and in a solid/liquid ratio of ¼.

| Composition of the solution | | Dissolution yields | | | Oxidizing gas |
|---|---|---|---|---|---|
| NH$_3$ | CO$_2$/NH$_3$ | Ni | Cu | Co | |
| 9 M/l | 0.16 | 75 | 91 | 43 | Air |
| 9 M/l | 0.16 | 83 | 87 | 15 | Oxygen |
| 5 M/l | 0.25 | 80 | 92 | 50 | Oxygen |

Compared with those of Example 4, these results show that, in the case of a solution containing a sufficient quantity of CO$_2$, the increase in the quantity of solid does not have any influence on the dissolution yields, which is not the case when the ratio CO$_2$/NH$_3$ is of a low order. It seems a likely assumption that this phenomenon arises from the precipitation of the manganese carbonate.

EXAMPLE 7

Influence of the initial nickel concentration of the leaching solution

In a countercurrent flow, the leach solution already contains solubilized cations and its dissolution power is therefore lessened. This effect is perceptible only above 4 g/l of Ni.

In consequence, nodules of batch 2 which are processed as in Example 3 but leached in a solid/liquid ratio of 1 to 4 and at 40° C have produced the following results:

| | | Percentage of solubilized metals | | |
|---|---|---|---|---|
| | | Ni | Cu | Co |
| fresh leach solution | | 77 | 83 | 70 |
| leach solution containing | 2 g/l of Ni | 79 | 83 | 37 |
| '' | 3.7 g/l of Ni | 88 | 86 | 50 |
| '' | 10 g/l of Ni | 10 | 87 | 50 |

In all these tests, the manganese and iron yields were of the order of 0.1 %. By carrying out complementary aeration of the solution after liquid/solid separation, it was possible to attain yields of 0.02 % of manganese and 0.04 % of iron.

However, should it be desired to produce a certain quantity of manganese, it is only necessary to carry out preliminary leaching of the roasted ore by a concentrated solution of NH$_3$ containing more than 10 M/l of NH$_3$ and having a ratio CO$_2$/NH$_3$ which is lower than 0.2, and without aeration. As the contacting time is shorter, so the quantity of manganese dissolved is larger. The same quantity of air contained in the solution makes it possible to retain good selectivity and to prevent dissolution of the iron. After the solid/liquid separation process, the solids are subjected to the main leaching process described earlier. The preliminary leach liquor is heated, diluted and aerated, which makes it possible to precipitate a mixture of carbonate and manganese oxide which is practically free of other elements. During the heating operation, part of the ammonia and carbon dioxide gas are desorbed. The "preliminary" liquor which no longer contains manganese can be employed after adjustment in NH$_3$ and CO$_2$ in the subsequent leaching stages for the recovery of copper, nickel and cobalt, namely in the main leaching process.

EXAMPLE 8

Dissolution of the manganese if necessary in the initial stage of the leaching process Nodules forming part of the first batch were ground to a particle size of 160 $\mu$, reduced at 400° C by hydrogen which was cooled in an inert atmosphere, then leached in two stages, the first without aeration but in a normal atmosphere, the second with aeration.

| Stage | Composition of the solution | | Duration | Temp. | Dissolution yields | | | | |
|---|---|---|---|---|---|---|---|---|---|
| | NH$_3$ | CO$_2$/NH$_3$ | | | Mn | Fe | Ni | Cu | Co |
| 1 | 16 | 0.19 | 1 hr | room temp. | 10% | 0.1% | 63% | 1% | 65% |
| 2 | 5 | 0.3 | 4 hr | 50° C | 0.2% | 0.1% | 57% | 87% | 50% |

The yield achieved by both stages was consequently 10 % in the case of Mn, 85 % in the case of Ni, 87 % in the case of Cu, 80 % in the case of Co.

By operating in an atmosphere which is depleted in oxygen with respect to air (of the order of 5 % of O$_2$), it is possible to attain yields of 60 % to 70 % in the case of Mn and of 2 % in the case of Fe.

This preliminary treatment makes it possible to obtain manganese carbonate directly and does not modify the main circuit in any respect whatever.

The liquor mainly contains the aminated complexes of the metals which are made leachable by the reduction process or leachable in their oxide form (zinc, copper). These metals essentially consist of cobalt, copper, nickel, cadmium and zinc and the liquor can be enriched in these metals by recycling. Iron (II) and manganese (II) also form complexes but they oxidize in air and these elements are present in the leach liquor only at very low concentrations. Magnesium and to a lesser extent calcium are partially soluble in the form of aminated complexes. Chromium can also form complexes if it is reduced to a valence of three but has very slow dissolution kinetics and the low chromium content of nodules make it possible to attain only a very low concentration of chromium-III in the leach liquor.

The metals in which the carbonates are soluble (alkaline) or sparingly soluble are present in the leach liquor next to the complex forms mentioned above.

After reduction and ammonia leaching, some metals can be solubilized in an anionic form. It is thus possible to find traces of aluminates, chromates, zirconates, titanates and silicates; in all these elements, the pH of the leach liquor which is buffered at about 9 and the absence of veritable alkaline ions are not conducive to good dissolution.

On the other hand, gallium which readily forms gallates is highly soluble and the same applies to molybdenum whereas vanadium is solubilized only to a partial extent.

EXAMPLE 9

Dissolution yield of the metals contained in the nodules

Nodules of the second batch were reduced at 400° C by hydrogen for a period of one-half hour, then cooled in an inert atmosphere and leached for a period of six hours at 40° C by an aerated solution containing a proportion of 9 M/l of $NH_3$ and 1.5 M/l of $CO_2$. The solid to liquid ratio was 1:10 (leaching + washing). The following dissolutions were obtained:

| Element | Leaching efficiency (%) | Concentration in the solution (mg/l) |
|---|---|---|
| Ni | 95 | 960 |
| Cu | 95 | 680 |
| Co | 70 | 150 |
| Mo | 56 | 120 |
| Zn | 100 | 84 |
| Mg | 1.6 | 48 |
| Mn | 0.05 | 11.3 |
| Fe | 0.08 | 6 |
| Al | 0.17 | 5 |
| V | 1.8 | 2.8 |
| Cd | 100 | 0.5 |
| Cr | 6.6 | 0.4 |
| Ca | 0.25 | 3 |
| Zr | 0.14 | 1 |
| Ti | 0.05 | 0.5 |
| Ba | 0.04 | 0.1 |
| Ga | 95 | 0.1 |

When the leach liquor is enriched by recycling, the concentrations of elements which form neither aminated complexes nor stable anions remain stationary and the proportion of impurities decreases with respect to the valuable elements.

After solid/liquid separation, the residues are washed with a liquor which is only slightly loaded with $NH_3$ and with $CO_2$ in order to avoid destruction of the aminated complexes and are then directed to the sludge distillation stage. The leach solution which is separated from the solid can be treated before proceeding to precipitation of the basic carbonates. Thus the addition of ammonium phosphate precipitates $Mg\,NH_4\,PO_4$, $Ca\,HPO_4$ and $Ba\,HPO_4$ as well as the traces of non-alkaline metallic cations which could have been solubilized in this form.

The molybdenum and the vanadium are partially complexed to form phosphomolybdates and ammonium phosphovanadates.

Aeration of the solution makes it possible to precipitate the manganese and the iron by oxidizing to $Mn^{IV}$ and $Fe^{III}$ and to bring the molybdenum, vanadium and chromium more completely to their highest valence state.

Finally, it is possible to remove the gallium, the molybdenum and the vanadium as well as the anionic impurities by means of an anionic resin in the form of carbonate.

It is possible by means of all these operations to retain in the liquor only the metals which are complexed by ammonia and the alkali metals. These purifications, however, are not essential requirements.

Whether these treatments are carried out or not, the recovery of the principal metals is achieved by distillation with steam entrainment. The metals are precipitated in the form of carbonates such as the basic carbonates of nickel, zinc or cobalt and manganese carbonate and in the form of hydroxides such as the hydroxides of iron, copper, aluminum and possibly of chromium.

The distilled ammonia, carbon dioxide gas and steam are recovered by condensation and absorption in order to regenerate the leaching and washing liquors.

Precipitation is carried out at approximately 90° C at atmospheric pressure by utilizing the hot gases derived from the distillation in order to pre-heat the ammonia liquor.

EXAMPLE 10

Precipitation of the metallic concentrate

Precipitation of the metals was carried out with steam entrainment of the gases from an ammonia solution containing 5 M/l of $NH_3$, 1.5 M/l of $CO_2$, 14.8 g/l of Ni, 11.8 g/l of Cu and 0.3 g/l of Co.

During the distillation, the pH value of the solution has decreased. When the final pH was 8.3, the losses were 0.02 % in the case of nickel, 0.005 % in the case of copper, 8.4 % in the case of cobalt. When small quantities of NaOH (of the order of 500 g/m³) were employed for distillation in order to complete the desorption of the ammonia and precipitation of the metals, the final pH was 8.8, the losses of nickel and copper had become undetectable and the losses of cobalt had dropped to 1.6 % whilst the use of sodium hydroxide made it possible to maintain anionic impurities partially in solution.

The wet precipitate represented on an average one-tenth by weight of the treated dry nodules and lost one-half its weight after drying at room temperature.

After the distillation process, the liquid effluents contain the alkaline ions and a certain number of soluble anions having a neutral pH: molybdates, vanadates, chromates (and gallate if the pH value is fairly high) which can be recovered by passing through an anionic resin in the form of carbonate or by employing a tertiary amine in the form of hydrochlorates or a quaternary ammonium salt. It is also possible to carry out a precipitation of the sulphides by $H_2S$ or $Na_2S$.

The precipitated concentrate essentially contains nickel, copper, cobalt, zinc, cadmium, variable proportions of magnesium, manganese, iron and traces of molybdenum (especially in the valence state V), vanadium, aluminum, silicon, titanium, zirconium and chromium which are essentially dependent on the treatment to which the leach liquor has been subjected prior to the precipitation stage.

Separation of the metals — Preparation of end products: FIG. 2

After any necessary transportation or storage, said concentrate is attacked by hydrochloric acid.

This attack is very rapid and can be carried out continuously in aerated vessels in order to facilitate complete evolution of the $CO_2$ which is produced at the time of dissolution of the carbonates.

It is an advantage to inject the hydrogen chloride gas formed from the chlorine which is liberated at the time of electrolysis of the nickel, into the pulp formed by the carbonates and the aqueous hydrochloric acid recycled from different points of the process (pyrohydrolysis of cobalt chloride and treatment of the copper chloride solution).

Under these conditions, there is obtained a solution having a pH value of the order of 1 and a volume which is approximately 100 liters per metric ton of treated dry nodules. A certain number of impurities remain insoluble and these are, for example, silica, molybdic acid, titanium and zirconium but these latter are present in a limited quantity.

If no purification of the leach liquor has been carried out prior to distillation, the hydrochloric acid solution has the following mean composition:

| | | | | |
|---|---|---|---|---|
| Ni | 100 | to | 120 | g/l |
| Cu | 80 | to | 110 | g/l |
| Co | 14 | to | 21 | g/l |
| Zn | 4 | to | 7 | g/l |
| Mg | 3 | to | 5 | g/l |
| Fe | 0.2 | to | 0.6 | g/l |
| Cd | 0.05 | g/l | | |
| Mn | 0.5 | g/l | | |
| Mo | 0.5 | g/l | | |
| Al | 0.5 | g/l | | |
| V | traces | | | |
| Ga | traces | | | |

This solution is treated by a liquid/liquid extraction cycle which can be performed in pulsed columns by reason of the small volume of the solutions. A first cycle of extraction by tributylphosphate (TBP) or by a secondary amine diluted in an organic diluent of the Solvesso or kerosene type permits simultaneous separation of iron, zinc, cadmium and gallium. When tributylphosphate is employed, molybdenum-V is partially solubilized in the organic phase until an equilibrium between the aqueous phase and the organic phase is attained without in any way affecting the extraction process. Similarly, if phosphates have been employed in the process, the traces of phosphomolybdates and the phosphovanadates are extracted.

TBP extraction from the neutral chloride complexes and stripping are very readily performed by means of slightly acidulated water in order to prevent any precipitation of the ferric hydroxide.

There may be a slight co-extraction of the copper chloride. Part of the aqueous stripping solution is employed for washing the loaded solvent, the wash solution being then re-injected with the charge.

Under these conditions, the iron, the zinc, the gallium and the cadmium are entirely extracted without carrying away any nickel, copper or cobalt.

The stripping solution is treated with sodium carbonate in order to precipitate a mixture of iron hydroxide, carbonate of zinc, gallium and cadmium. After separation of this precipitate, the liquid effluent represents approximately 25 liters per metric ton of nodules processed and essentially contains sodium chloride.

All the aqueous solutions which have been in contact with the organic phase are washed with pure diluent in order to strip the small quantities of organic solvent which have been dissolved in the aqueous phase. This technique makes it possible to reduce solvent losses.

EXAMPLE 11

Extraction by the mixture:
TBP 50 %
Solvesso 50 %

An aqueous phase containing the metallic chlorides had the following composition: 0.1 N free HCl, Ni 130 g/l, Cu 86 g/l, Co 22 g/l, Fe 0.6 g/l, Zn invariable. Said aqueous phase was contacted with an organic phase constituted by an equal-volume mixture of TBP and Solvesso. The partition coefficients obtained (kd = concentration of organic phase to concentration of aqueous phase) were as follows in the case of different proportions of zinc in the aqueous phase:

| $Zn_{aq}$ | kd(Zn) | kd(Ni) | kd(Cu) | kd(Co) | kd(Fe) |
|---|---|---|---|---|---|
| 1 g/l | 1 | | | | |
| 3 g/l | 0.73 | $1.5 \times 10^3$ | 0.1 | $3.10^3$ | 3 |
| 5 g/l | 0.63 | | | | |
| 8 g/l | 0.48 | | | | |

A separation of the iron from the zinc was carried out in a continuous operation. The hydrochloric acid solution containing a free acidity of approximately 0.2 N, 100 g/l of nickel, 73.3 g/l of copper, 34 g/l of cobalt, 4.4 g/l of zinc and 0.45 of iron. This solution was injected at a flow rate V into a bank of mixer-settlers in which the mixture of 50 % TBP — 50 % Solvesso was circulated countercurrentwise at a flow rate of 2 V. Scrubbing was a reflux of the stripping process:

Results have shown that the raffinate contained less than 2 mg/l of iron and of zinc and that it was only necessary to increase the number of extraction stages in order to obtain the desired purification of the hydrochloric acid liquor.

The stripping liquor contained 23.6 g/l of zinc, less than 1 mg/l of copper and no trace of nickel or of cobalt. The losses of copper were therefore $3.4 \times 10^{-4}$ %. Finally, the washing operation proved necessary since the concentrations in the scrubbing aqueous phases were as follows:

| Stage No | 1 | 2 | 3 | 4 | 5 | 6 |
|---|---|---|---|---|---|---|
| Cu mg/l | 45 000 | 6 650 | 1 240 | 382 | 67 | 16 |
| Ni mg/l | 2 900 | 206 | 53 | 10 | 6 | 3 |
| Co mg/l | 1 630 | 208 | 56 | 9 | 5 | 2 |

In the scrubbing section, there is a constriction for the zinc and the iron, thus making it possible to increase the number of stages if it is desired to reduce the losses of copper.

In all cases contacting times of the order of one minute have proved wholly sufficient.

After the TBP extraction cycle, the hydrochloric acid liquor having a volume of approximately 110 liters is passed to the copper separation stage. The copper is extracted by a tertiary amine hydrochlorate such as triisooctyl amine TiOA diluted to 20 % in Solvesso; the mixture contains approximately 3 % heavy alcohol which is insoluble in water of the heptanol or isodecanol type. The copper is stripped by very slightly acidified water (HCl having a pH value of 2.5 to 3) in order to promote settling.

At the time of countercurrent extraction, the cobalt extracts less readily than copper but its co-extraction is not negligible. It is therefore essential to scrub the loaded solvent in order to strip the entire quantity of cobalt. The scrubbing solution is constituted by part of the aqueous stripping solution which has a copper chloride concentration. When Adogen 381 of the Ashland company is employed for separating the copper from the cobalt, the rates of stripping are of a low order and contacting times of the order of 2 to 4 mm must be employed if it is desired to attain good efficiency at each stage. Settling is good. The commercially available triisoactylamines known as Alamine 336 (General Mills) and Hostarex A 324 (Hoechst) permit higher stripping rates but less satisfactory settling.

During extraction of the copper, the only extractable impurities are molybdenum VI, vanadium V (if these latter are not complexed by phosphates) and the $HSO_4^-$ ions or $SO_4^-$ ions in the state of traces in the solution. These impurities are very strongly bonded to the amine and are not extractable in water even when acidified to a pH value of 1. (it is necessary to have an acidity of at least 2 N in aqueous phase in order to strip one-fifth of the extracted molybdenum VI). The stripped copper is therefore entirely free of molybdenum and vanadium. However, the solvent must not be allowed to become enriched with impurities at each cycle and its molybdenum and vanadium load must be limited to a range of approximately 0.5 g/l and 1 g/l in order to prevent the precipitation of amine heteropolymolybdates. It is for this reason that, after stripping of the copper, a small proportion of the solvent is diverted to a treatment circuit in which it is contacted with an aqueous solution of sodium carbonate or of ammonium which is capable of stripping the molybdenum, the vanadium, the sulphates and the chlorides. The amine is present in the free form after this operation and must be salified by hydrochloric acid before being returned to the copper extraction.

EXAMPLE 12

Copper-cobalt separation (organic phase 20 % Adogen 381, 3 % heptanol, 77 % Solvesso)

In the presence of 100 g/l of nickel, the partition coefficients of the copper and the cobalt are as follows:

| $Co_{aq.}$ (g/l) | kD(Cu) ($Cu_{aq.}$ = 10 g/l) |
|---|---|
| 2.5 | 0.61 |
| 15 | 0.68 |
| 25 | 0.69 |
| 45 | 0.73 |

| $Cu_{aq}$ (g/l) | kD(Co) ($Co_{aq}$ = 20 g/l) |
|---|---|
| 0 | 0.2 |
| 10 | 0.038 |
| 25 | 0.020 |
| 40 | 0.014 |

When no nickel is present, the partition coefficients become:

| $Co_{aq.}$ (g/l) | kd(Cu) ($Cu_{aq.}$ = 50 g/l) | $Cu_{aq.}$ (g/l) | kd(Co) ($Co_{aq.}$ = 20 g/l) |
|---|---|---|---|
| 1 | 0.08 | 37 | 0.0030 |
| 10 | 0.10 | | 0.0025 |
| 25 | 0.11 | | 0.0015 |
| 45 | 0.14 | | |

These differences between partition coefficients show that a very good separation can be obtained if a small excess quantity of solvent is employed with respect to the necessary capacity for copper. Under these conditions, the cobalt extracted at the beginning of the countercurrent flow when the concentration of copper in the aqueous phase is low is replaced to a very appreciable extent by the copper in the extraction stages which are adjacent to the charge inlet; and the cobalt concentration of the organic phase is low when the solvent passes into the scrubbing section.

In this section, the cobalt is completely stripped from the solvent if the number of stages is sufficient. In order to prevent overenrichment of the aqueous phase in copper, it is necessary to utilize a process which provides a washing "constriction" for the copper.

An extraction has been performed under these conditions from a hydrochloric acid solution containing 108.5 g/l of nickel, 74.4 g/l of copper and 19.8 g/l of cobalt.

The results obtained are indicated in the diagram. The copper and cobalt profiles were as follows:

|  | Stages | Copper Aqueous phase g/l | Copper Aqueous phase g/l | Cobalt Aqueous phase g/l | Cobalt Organic phase g/l |
| --- | --- | --- | --- | --- | --- |
| Extraction | 1 | 0.0061 | 0.020 | 16.1 | 3.4 |
|  | 2 | 0.19 | 0.42 | 36.8 | 5.5 |
|  | 3 | 2.5 | 2.5 | 52.5 | 5.4 |
|  | 4 | 16.4 | 6.6 | 54.3 | 2.8 |
|  | 5 | 53.1 | 10.9 | 40 | 1.2 |
| Scrubbing | 1 | 94.6 | 10.1 | 49.5 | 1.05 |
|  | 2 | 111 | 10 | 38.6 | 0.64 |
|  | 3 | 123 | 10.1 | 26.9 | 0.36 |
|  | 4 | 123 | 10.2 | 15.3 | 0.26 |
|  | 5 | 116 | 10.9 | 7.9 | 0.25 |
|  | 6 | 104 | 10.3 | 3.42 | 0.074 |

In this test, 99.99 % of the copper was extracted together with 3.3 % of the cobalt, thus resulting in ratios Cu/Co = 0.038 % in the raffinate and Co/Cu = 0.71 % in the strip solution. By increasing the unduly short contacting times in the test (1 minute) or the number of extraction and scrubbing stages, the results are improved and it is possible to attain purities of Cu/Co = < 0.015 % and Co/Cu < 0.01 %.

The stripping liquor which has a high copper content (approximately 100 liters per metric ton of dry nodules) is washed with diluent in order to remove all traces of amine hydrochlorate and sent to a medium-changing operation.

In this operation, the copper chloride solution is mixed with a commercially available heat-transporting fluid of the glycerine type and with the sulphuric acid liquor derived from the electrolysis of the copper which contains free sulphuric acid and copper sulphate. The mixture is heated and the hydrochloric acid and the water are distilled while the copper sulphate is formed. The acid is returned to the initial basic carbonate leach.

The distillate is passed to a vessel in which the copper sulphate and the sulphuric acid which have not been consumed are solubilized in water and separated from the heat-transporting fluid which is recycled to the distillation. The proportion of $Cl^-$ ions is lower than $2 \times 10^{-2}N$.

The copper sulphate liquor is then sent to the electrolysis. The copper produced is in a high state of purity provided that a purge is carried out in order to maintain the proportion of cobalt in the electrolytic bath at approximately 2 g/l. Said purge is treated with sodium carbonate. The precipitated copper and cobalt carbonates are recycled to the initial leach. Losses of hydrochloric acid are approximately 25 to 30 g per metric ton of dry nodules.

The copper extraction raffinate represents a volume of approximately 130 liters per metric ton of treated dry nodules and essentially contains nickel (80 to 95 g/l) and cobalt (11 to 16 g/l).

Prior to extraction of the cobalt, the liquor is concentrated to approximately one-half. The losses of hydrochloric acid in this operation do not exceed 50 g of acid per metric ton of nodules treated by leaching.

The cobalt is extracted by an amine hydrochlorate and it is an advantage to employ an organic phase which is identical with that of the copper extraction. The partition coefficients of nickel are produced very simply by a cycle of extraction, scrubbing, stripping.

EXAMPLE 13

Extraction of cobalt

Organic phase: 20 % Adogen 381, 3 % Heptanol, 77 % Solvesso

In the presence of 120 g/l$^{-1}$ of nickel in the form of $NiCl_2$ in the solution, the partition coefficients of cobalt and manganese are as follows:

| $Co_{aq.}$ (g/l) | kd(Co) | $Mn_{aq.}$ (g/l) | kd(Mn) |
| --- | --- | --- | --- |
| 1 | 1.20 | 1 | 0.6 |
| 5 | 0.52 | 5 | 0.22 |
| 10 | 0.42 | 10 | 0.20 |
| 20 | 0.27 | 20 | 0.16 |
| 40 | 0.18 |  |  |
| 60 | 0.14 |  |  |

In the case of a concentration of 100 g/l of nickel in the aqueous phase, the organic phase only extracts 4 mg/l of nickel. Under these conditions, its partition coefficient is therefore only $4 \times 10^{-5}$.

The cobalt is then stripped with water and there is thus obtained a liquor which represents 23 to 32 liters per metric ton of treated nodules and contains approximately 65 g/l of cobalt. This liquor is scrubbed with diluent in order to remove the undesirable organic products, concentrated and then pyrohydrolyzed at about 800° C in order to produce cobalt oxide which is a mixture of CoO and of $Co_3O_4$. The regenerated hydrochloric acid is returned to the initial carbonate concentrate leach. The raffinate from the cobalt extraction undergoes scrubbing with diluent. This raffinate represents approximately 80 liters per ton of treated nodules, contains nickel chloride and can contain certain impurities (essentially magnesium, manganese and traces of aluminum, molybdenum V, vanadium and chromium).

When the ammonia liquor produced at the time of leaching of the nodules has been treated prior to precipitation of the basic carbonates, the proportions of impurities are so low that electrolysis of the nickel can be carried out directly.

To this end, the nickel chloride liquor is sent into a buffer store from which is performed on the one hand the electrolysis which produces metallic nickel and chlorine and on the other hand a concentration which makes it possible to maintain constant the proportion of nickel chloride in the electrolyte.

The electrolysis takes place with a small difference in concentration between the feed electrolyte and the exit electrolyte in order to maintain high current efficiencies with a substantial flow rate. The degassed chlorine is recombined with hydrogen and the gaseous hydrogen chloride is recycled to the initial carbonate leach.

EXAMPLE 14

Electrolysis of nickel

The solution containing 200 g/l of $NiCl_2$, 40 g/l of $H_3BO_3$ is subjected to electrolysis without diaphragm by means of insoluble anodes with a current density of 625 A/m$^2$ and a voltage in the vicinity of 4.2 volts, which produces high-purity nickel as well as chlorine. The distance between the cathodes is 10 cm and the temperature is in the vicinity of 70° C, in which case the power consumption efficiecy attains 91.3 %.

When the ammonia solution for leaching the nodules has not been treated, the nickel chloride liquor contains metallic cations which are extracted at a pH value of 3.5 approximately by di-(2-ethylhexyl) phosphoric acid diluted to 10 % in Solvesso and in the presence of 2 to 5 % of a heavy alcohol which is immiscible with water (isodecanol or heptanol). Prior to extraction, the organic acid is converted to nickel salt. The extraction raffinate which contains nickel and magnesium is subjected to electrolysis.

During this operation, the magnesium chloride serves as an indifferent electrolyte and its concentration is maintained constant by means of a purge. In the $D_2EHPA$ cycle, said purge is utilized for conditioning the solvent or in other words the nickel is separated from the magnesium at a pH value of approximately 4.5 and salifies the di-(2-ethylhexyl) phosphoric acid.

The traces of anionic impurities (molybdenum) are not extracted by $D_2EHPA$. They follow the magnesium in the effluents and form electrolysis sludges.

We claim:
1. A method of extraction of metallic elements from manganiferous ores and more particularly from submarine nodules in which the ore is roasted in a controlled reducing atmosphere, cooled in an inert atmosphere, leached in a number of countercurrent stages by means of a mixture of ammonia and aerated ammonium carbonate in a concentration ratio such as to obtain a buffered pH value of the solution which is distilled by steam entrainment thereby causing precipitation of the carbonates, wherein the concentrate obtained is attacked by hydrochloric acid, the resultant hydrochloric acid leach solution is subjected to a first cycle of extraction by an organic solvent selected from tributyl-phosphate and a secondary amine diluted in an organic diluent comprising extraction, washing and stripping so that the stripping liquor contains iron, zinc, cadmium and gallium whilst the liquor constituted by the first raffinate at the outlet of the extraction unit mainly contains nickel, cobalt and copper, the hydrochloric liquor of the first raffinate is subjected to a second cycle of extraction by an organic solvent constituted by a tertiary amine hydrochlorate diluted in an organic diluent comprising extraction, washing and then stripping so that the stripping liquor contains copper while the liquor which constitutes the second raffinate at the outlet of the extraction unit mainly contains cobalt and nickel, the hydrochloric acid liquor of the second raffinate is reprocessed, concentrated and subjected to a third cycle of extraction by an organic solvent constituted by a tertiary amine hydrochlorate diluted in an organic diluent comprising extraction, washing and stripping so that the stripping liquor contains the cobalt whilst the liquor which constitutes the third raffinate at the outlet of the extraction unit mainly contains nickel.

2. A method according to claim 1 wherein, in the first extraction cycle, part of the aqueous stripping solution is used for washing the loaded solvent, the wash solution being then re-injected with the charge.

3. A method according to claim 1, wherein the zinc, gallium, cadmium and iron contained in the strip solution of the first cycle are precipitated in the state of carbonate.

4. A method according to claim 1 wherein, in the second extraction cycle, the wash solution is constituted by part of the aqueous stripping solution which is concentrated in copper chloride.

5. A method according to claim 1 wherein, after stripping of the copper, a small part of the solvent is diverted to a treatment circuit in which it is contacted with an aqueous solution which is capable of stripping the molybdenum, the vanadium, the sulphates and the chlorides and wherein the treated solvent is salified before being returned to the extraction.

6. A method according to claim 1, wherein the stripping liquor which is rich in copper and has previously been mixed with a heat-transporting fluid and with a sulphuric acid liquor is distilled after washing and wherein the distillate is solubilized, separated from the heat-transporting fluid which is recycled to the distillation whilst the copper sulphate which has formed is subjected to electrolysis.

7. A method according to claim 6, wherein the sulphuric acid liquor mixed with the heat-transporting fluid is obtained from the electrolysis of the copper.

8. A method according to claim 6, wherein there is performed during the electrolysis a purge which is treated so as to precipitate the copper and the cobalt to the state of carbonate, said copper and cobalt being recycled to the initial acid leach.

9. A method according to claim 1, wherein the raffinate of the second extraction is concentrated then sent to the third extraction cycle in which the wash solution is constituted by part of the aqueous stripping solution which is concentrated in copper chloride.

10. A method according to claim 1 wherein, at the stage of the third extraction cycle, the stripping liquor of the cobalt is washed, concentrated and pyrohydrolyzed in order to obtain cobalt oxide.

11. A method according to claim 1, wherein the raffinate from the extraction of the cobalt which contains nickel chloride and certain impurities is subjected to extraction by the nickel salt of di-(2-ethylhexyl) phosphoric acid diluted in an organic diluent in the presence of a heavy alcohol in order to separate the nickel and magnesium chlorides which are sent into a buffer store from which is carried out the electrolysis which produces the nickel and the chlorine.

12. A method according to claim 1, wherein the concentration of the magnesium chloride in the buffer is maintained constant by means of a purge from which the nickel is separated from the magnesium in order to salify the di-(2-ethylhexyl) phosphoric acid which is employed for the extraction.

13. A method according to claim 1, wherein the chlorine which is liberated during electrolysis is recombined with hydrogen in order to produce gaseous hydrochloric acid.

14. A method according to claim 1, wherein the gaseous hydrochloric acid which is liberated at the time of distillation of the copper chloride stripping liquor, at the time of pyrohydrolysis of cobalt chloride, at the time of recombination of the hydrogen and the chlorine of the nickel electrolysis is recycled to the initial hydrochloric acid leach.

15. A method according to claim 1, wherein the leach solution which is separated from the solid receives an addition of ammonium phosphate in an aerated medium in order to precipitate the magnesium, the calcium, the barium, the manganese, the iron and the traces of non-alkaline metallic cations.

16. A method according to claim 1, wherein gallium, molybdenum, vanadium and the anionic impurities are removed by treating the leach solution with an anionic resin.

17. A method according to claim 1 wherein, after leaching in a normal atmosphere, the solid phase is separated from the liquid phase which is aerated in order to recover the manganese carbonate whilst the solid phase is subjected to countercurrent leaching with the mixture of ammonia and aerated ammonium carbonate.

* * * * *